United States Patent [19]

Tzikas

[11] 4,265,633
[45] May 5, 1981

[54] PROCESS FOR THE MANUFACTURE OF VAT DYES

[75] Inventor: Athanassios Tzikas, Pratteln, Switzerland

[73] Assignee: Ciba-Geigy AG, Basel, Switzerland

[21] Appl. No.: 3,327

[22] Filed: Jan. 15, 1979

[30] Foreign Application Priority Data

Jan. 18, 1978 [CH] Switzerland .......................... 515/78

[51] Int. Cl.³ ...................... C09B 67/28; C07D 251/00
[52] U.S. Cl. ........................................ 8/650; 544/189; 544/194
[58] Field of Search ...................... 8/34, 650; 544/189, 544/194

[56] References Cited

U.S. PATENT DOCUMENTS 3,972,881   8/1976   Altermatt ............................ 544/189

FOREIGN PATENT DOCUMENTS 399485   7/1924   Fed. Rep. of Germany .

*Primary Examiner*—A. Lionel Clingman
*Attorney, Agent, or Firm*—Edward McC. Roberts; John P. Spitals

[57] ABSTRACT

The invention provides a process for the manufacture of vat dyes of the formula

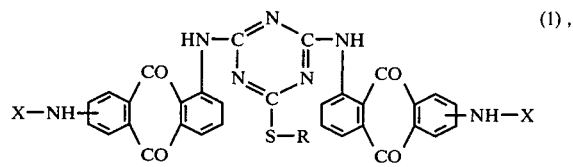

wherein R is alkyl of 1 to 4 carbon atoms and X is an acyl radical, which comprises condensing a diaminoanthraquinone of the formula

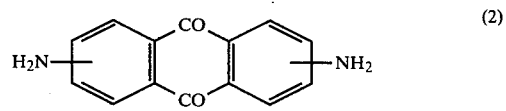

or mixtures of diaminoanthraquinones of the formula (2), with a 2,4-dihalogeno-6-alkylthio-s-triazine of the formula

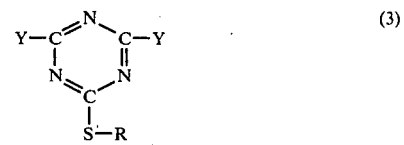

wherein Y is halogen and R is as defined for formula (1), in the molar ratio 2:1, and condensing the resulting intermediate of the formula

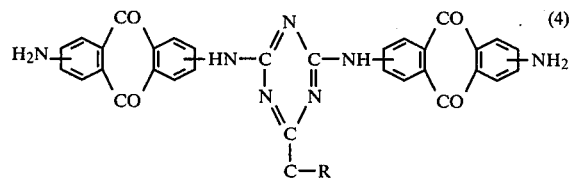

with an acylating agent containing the acyl radical X which is as defined for formula (1), in the molar ratio 1:2.

4 Claims, No Drawings

PROCESS FOR THE MANUFACTURE OF VAT DYES

The present invention provides a process for the manufacture of vat dyes of the formula

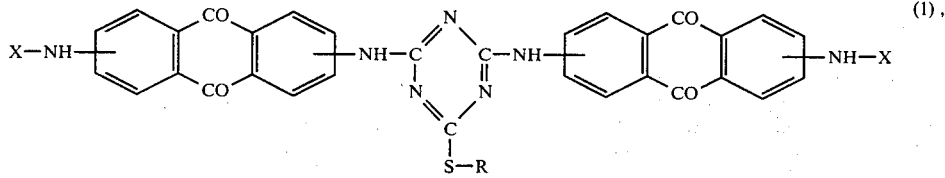

wherein R is alkyl of 1 to 4 carbon atoms and X is an acyl radical, which comprises condensing a diaminoanthraquinone of the formula

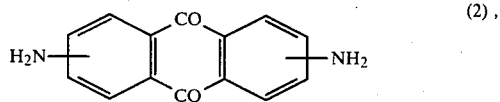

with a 2,4-dihalogeno-6-alkylthio-s-triazine of the formula

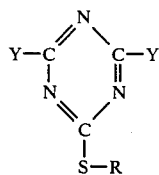

wherein Y is halogen and R is as defined for formula (1), in the molar ratio 2:1, and condensing the resulting intermediate of the formula

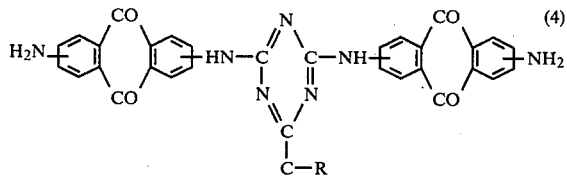

with an acylating agent which contains the acyl radical X, which is as defined for formula (1), in the molar ratio 1:2.

In formula (1), in each of the two anthraquinone nuclei the X—NH group is bonded to the external benzene ring and the —NH bridge member to the triazine radical is bonded to the internal benzene ring. The X—NH group and the —NH bridge member, each independently of the other, can be in the α- or β-position of the anthraquinone nucleus.

R as alkyl of 1 to 4 carbon atoms can be: methyl, ethyl, proply, isopropyl, butyl, isobutyl, sec-butyl and tert-butyl. The acyl radical X is the radical of an aromatic carboxylic acid or sulfonic acid, especially of the benzene series, which can be further substituted by chlorine, nitro, methyl, methoxy and the like, or is an alkanoyl or alkylsulfonyl radical which can be further substituted in the alkyl moiety by chlorine, nitro, phenyl etc. Representative examples of acyl radicals X are: benzoyl, p-chlorobenzoyl, p-nitrobenzoyl, p-phenylbenzoyl, benzenesulfonyl, p-toluenesulfonyl and acetyl.

The starting diaminoanthraquinone of the formula (2) is known, as are also the starting alkylthio-dihalogeno-s-triazines of the formula (3) which can be obtained by reaction of trihalogeno-s-triazines with an alkali sulfide and subsequent reaction with an alkyl halide, or by reaction of trihalogeno-s-triazines with alkyl mercaptans or with a corresponding alkali mercaptide.

Possible values for Y as halogen are fluorine, chlorine and bromine. Suitable acylating agents containing the acyl radical X, which is as defined for formula (1), are in particular halides and anhydrides of aromatic and aliphatic carboxylic acids and sulfonic acids. Representative examples are: benzoyl chloride, p-chlorobenzoyl chloride, benzenesulfonyl chloride, naphthalene-1-carboxylic acid chloride, naphthalene-1-carboxylic anhydride and other compounds mentioned in the subsequent list of possible reaction components.

In order to avoid the formation of the dicondensation product of 1 mole of diaminoanthraquinone and 2 moles of alkylthio-dihalogeno-s-triazine in the process of the present invention, it is necessary to carry out the reaction such that there is always an excess of diaminoanthraquinone present. This can be accomplished by adding the alkylthio-dihalogeno-s-triazine dropwise or pouring it into a solution of suspension of the diaminoanthraquinone. Under this condition the alkylthio-dihalogeno-s-triazine reacts rapidly with 1 mole of diaminoanthraquinone to form a monocondensation product and subsequently with a further mole of diaminoanthraquinone to form the intermediate of the formula (4). A dicondensation product of 1 mole of diaminoanthraquinone can no longer result in this embodiment of the process, because on the one hand the second halogen at the s-triazine radical is much less reactive than the first, and on the other hand the second, still free $H_2N$ group at the anthraquinone nucleus can be less readily condensed. Preferably the reaction is carried out at elevated temperature in an inert organic solvent, and the reaction temperature depends basically on the boiling point of the solvent. Suitable inert solvents are preferably nitrobenzene and o-dichlorobenzene. In order to bring the condensation between the alkylthio-dihalogeno-s-triazine and the diaminoanthraquinone to completion, it is advantageous to add a condensation catalyst, for example pyridine, to the solution. The reaction of the intermediate of the formula (4) with the acylating agent containing the acyl radical X is also carried out at elevated temperature and preferably in the same solvent as the condensation of the alkylthiodihalogeno-s-triazine with the diaminoanthraquinone. If desired, the acylating agent is added to the reaction mixture together with a condensation catalyst.

A preferred embodiment of the process of the invention accordingly comprises dissolving at elevated temperature the 2,4-dihalogeno-6-alkylthios-s-triazine in an organic solvent, adding this solution slowly to the suspension of the diaminoanthraquinone in an inert organic solvent, and then, when the addition of the 2,4-dihalogeno-6-alkylthio-s-triazine is complete, adding a condensation catalyst and bringing the condensation to completion, and, finally, adding the acylating agent to the reaction mixture, if desired together with a condensation catalyst, and bringing the condensation reaction to completion.

Preferably nitrobenzene or o-dichlorobenzene is used as inert organic solvent.

A particularly preferred embodiment of the above described process comprises condensing 1,5-diaminoanthraquinone, 2,4-dichloro-6-methylthio-s-triazine and benzoyl chloride in nitrobenzene to produce the vat dye of the formula

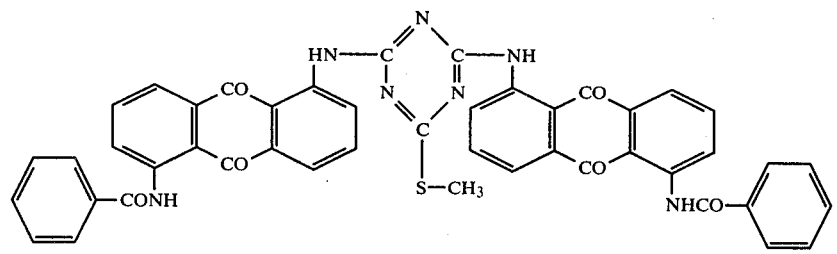

(5)

As starting materials which can be used for the manufacture of the formula (1) by the process of the present invention there may be mentioned:

Diaminoanthraquinones of the formula (2)

1,5-diaminoanthraquinone,
1,7-diaminoanthraquinone,
2,6-diaminoanthraquinone,
1,8-diaminoanthraquinone,
1,6-diaminoanthraquinone,
2,7-diaminoanthraquinone.

2,4-Dihalogeno-6-alkylthio-s-triazines of the formula (3)

2,4-dichloro-6-methylthio-s-triazine,
2,4-dichloro-6-ethylthio-s-triazine,
2,4-dichloro-6-propylthio-s-triazine,
2,4-dichloro-6-isopropylthio-s-triazine,
2,4-dichloro-6-butylthio-s-triazine,
2,4-dibromo-6-methylthio-s-triazine,
2,4-dibromo-6-ethylthio-s-triazine,
2,4-difluoro-6-ethylthios-s-triazine,
2,4-difluoro-6-butylthio-s-triazine.

Acylating agents containing the acyl radical X acetyl chloride,
acetic anhydride,
proprionyl chloride,
proprionic anhydride,
butyryl chloride,
acetyl bromide,
acrylyl chloride,
acrylic anhydride,
crotonic anhydride,
chloroacetyl chloride,
chloroacetic anhydride,
β-chloropropionyl chloride,
γ-chlorobutyryl chloride,
benzoyl chloride,
benzoic anhydride,
o-, m- and p-chlorobenzoyl chloride,
benzoyl bromide,
benzoyl fluoride,
m- and p-nitrobenzoyl chloride,
p-hydroxybenzoyl chloride,
p-phenylbenzoyl chloride,
chlorophenoxyacetyl chloride,
phenylacetyl chloride,
o-, m- and p-toluoyl chloride,
1-naphthoyl chloride,
2-naphthoyl chloride,
1-naphthoyl anhydride,
2-naphthoyl anhydride,
2-hydroxyanthracene-3-carboxylic chloride,
anthraquinone-1-carboxylic acid chloride,
anthraquinone-2-carboxylic acid chloride,
anthraquinone-1-carboxylic anhydride,
anthraquinone-2-carboxylic anhydride,
1-aminoanthraquinone-2-carboxylic acid chloride,
methanesulfonyl chloride,
chloromethanesulfonyl chloride,
trichloromethanesulfonyl chloride,
methanesulfonyl chloride,
2-chloroethanesulfonyl chloride,
vinylsulfonyl chloride,
vinylsulfonyl fluoride,
3-chloropropanesulfonyl chloride,
1-chlorbutane-3-sulfonyl chloride,
1-chlorobutane-4-sulfonyl chloride,
allylsulfonyl chloride,
benzylsulfonyl chloride,
4-nitrobenzylsulfonyl chloride,
benzenesulfonyl chloride,
2-methylbenzenesulfonyl chloride,
3-methylbenzenesulfonyl chloride,
4-methylbenzenesulfonyl chloride,
2-nitrotoluene-4-sulfonyl chloride,
2-chlorotoluene-4-sulfonyl chloride,
4-chloromethylbenzenesulfonyl chloride,
4-acetylaminomethyl-benzenesulfonyl chloride,
2,4-dimethylbenzenesulfonyl chloride,
2,5-dimethylbenzenesulfonyl chloride,
4-(2'-bromoethyl-benzenesulfonyl chloride,
2,4,5-trimethylbenzenesulfonyl chloride,
hydrindene-5-sulfonyl chloride,
5,6,7,8-tetrahydronaphthalene-2-sulfonyl chloride,
4-n-octylbenzenesulfonyl chloride,
4-dodecylbenzenesulfonyl chloride,
4-chlorobenzenesulfonyl chloride,
3-chlorobenzenesulfonyl chloride,
2-chlorobenzenesulfonyl chloride,
2,5-dichlorobenzenesulfonyl chloride,
3,4-dichlorobenzenesulfonyl chloride,
2,4,5-trichlorobenzenesulfonyl chloride,
2-nitrobenzenesulfonyl chloride,
4-nitrobenzenesulfonyl chloride,
4-acetylaminobenzenesulfonyl chloride,
4-methoxybenzenesulfonyl chloride, 3-chloro-4-methylbenzenesulfonyl chloride,
4-chloro-3-methylbenzenesulfonyl chloride,
4-methyl-3-nitrobenzenesulfonyl chloride,
2-methyl-5-nitrobenzenesulfonyl chloride,
3-carboxy-4-hydroxy-benzoylsulfonyl chloride,
4-chloro-2-nitrobenzenesulfonyl chloride,
6-chloro-3-nitrobenzenesulfonyl chloride,
3,5-dichloro-2-hydroxybenzenesulfonyl choride,
5-chloro-4-methyl-3-nitrobenzenesulfonyl chloride,
3-chloro-2-methyl-5-nitrobenzenesulfonyl chloride,
4-methoxy-3-acetylaminobenzenesulfonyl chloride,
2-amino-4,5-dichlorobenzenesulfonyl chloride,
naphthalene-1-sulfonyl chloride,
naphthalene-2-sulfonyl chloride,
acenapthalene-3-sulfonyl chloride,
acenaphthene-5-sulfonyl chloride, methanesulfonyl bromide, methanesulfonyl fluoride, bromomethanesulfonyl bromide, ethanesulfonyl bromide, benzenesulfonyl bromide, benzenesulfonyl fluoride, 4-methylbenzenesulfonyl bromide, 2-bromotoluene-4-sulfonyl fluoride, 2-bromoethanesulfonyl bromide, 4-methoxybenzenesulfonyl fluoride, perfluorobutylsulfonyl fluoride, nicotinyl chloride, isophthaloyl chloride, terephthaloyl chloride.

Instead of using a unitary diaminoanthraquinone of the formula (2) it is also possible to use a mixture of diaminoanthraquinones, for example a mixture of 1,5-, 1,6- and 1,7-diaminoanthraquinone. Mixtures of the diaminoanthraquinones which are formed in the industrial manufacture of diaminoanthraquinones by dinitration of anthraquinone and subsequent reduction are particularly suitable. Such mixtures contain for example small amounts of 2,7- and 2,8-diaminoanthraquinone (β-isomers) and 1-aminoanthraquinone in addition to the 1,8-, 1,5-, 1,7- and 1,6-diaminoanthraquinones principally obtained, or they contain small amounts of 1-aminoanthraquinone, 2-aminoanthraquinone and 1-amino-2-, -4-, -5- and -8-hydroxyanthraquinone in addition to 1,6-, 1,8-, 1,7-, 2,6-, 2,7- and 1,5-diaminoanthraquinone.

The process of the present invention has one advantage over the prior art. In the known method of obtaining vat dyes of the formula (1), the process of German Offenlegungsschrift No. 2,439,950, the starting material is a 1-amino-5-acylaminoanthraquinone, which is reacted with an alkylthio-dichlorotriazine. The 1-amino-5-acylaminoanthraquinone used as starting material is obtained by reaction of 1,5-diaminoanthraquinone with an acylating agent. A substantial amount of 1,5-dicondensation product is formed in this reaction, so that a large amount of starting material is lost.

In contradistinction thereto, almost theoretical yields are obtained in the process of the invention. Accordingly, no losses of starting material occur, so that the final products can be obtained more cheaply than by the method of the prior art.

The vat dyes of the formula (1) obtained according to the invention are suitable for dyeing and printing the most diverse materials, in particular for dyeing and printing fibres made from natural or regenerated cellulose in the presence of reducing agents, e.g. dithionite.

The dyeings obtained are distinguished by outstanding levelness properties. The fastness properties are in general very good, especially the fastness to light, water, chlorine and boiling soda. The new dyes reserve polyester fibres well and produce tone-in-tone dyeings thereon, which makes them suitable for dyeing fibre blends in admixture with disperse dyes.

The dyes of this invention can also be used as pigments. Owing to their favourable properties, they can be used for the most varied types of pigment application, e.g. in finely divided form for the colouration of viscose rayon and viscose or of cellulose ethers or esters or of polyamides or polyurethanes or of polyesters in the melt, as well as for the preparation of coloured lacquers or of lake-formers, of solutions or products made from acetyl cellulose, nitrocellulose, natural resins, for example polymerisation resins or condensation resins, e.g. aminoplasts, alkyd resins, phenolic plastics, polyolefins, such as polystyrene, polyvinyl chloride, polyethylene, polypropylene, polyacrylonitrile, rubber, casein, silicone and silicone resins. In addition, the dyes of the present invention can be used with advantage in the manufacture of coloured pencils, cosmetic preparations or laminate sheets.

The following Examples illustrate the invention, the parts and percentages being by weight unless otherwise stated.

EXAMPLE 1

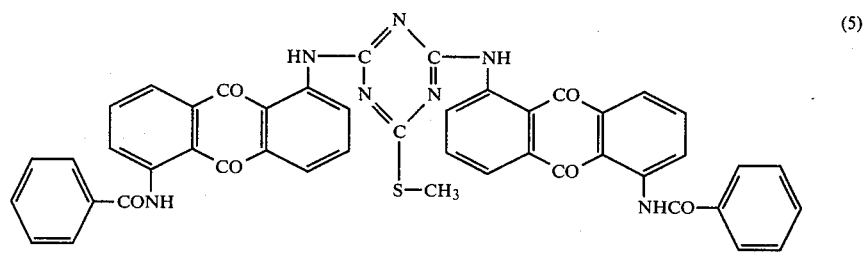

(5)

47.6 parts of 1,5-diaminoanthraquinone are suspended at room temperature in 600 parts of distilled nitrobenzene. The suspension is heated to 140° C. and a solution of 19,6 arts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0.2 part of pyridine is added and stirring is continued for a further 5 hours. The reaction mixture is allowed to cool to 80° C. and 40 parts of benzoyl chloride and 0.2 part of pyridine are added. The reaction mixture is subsequently heated, stirred for 7 hours at 140° to 145° C., then cooled to between 70° and 80° C. and filtered. The residue is collected by suction and washed with ethanol until the washings no longer contain nitrobenzene. The filter cake is dried at 100° C. overnight in a vacuum drying cabinet.

Yield: 79 parts.
Shade: golden orange.

EXAMPLE 2

The same dye is obtained by substituting equivalent amounts of benzoyl bromide, benzoyl fluoride or benzoic anhydride for benzoyl chloride in Example 1.

EXAMPLE 3

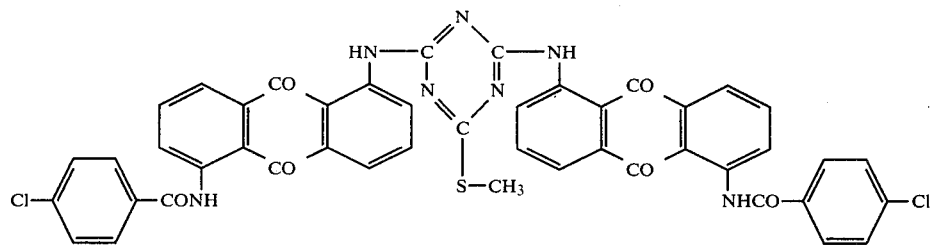

95.2 parts of 1,5-diaminoanthraquinone are suspended at room temperature in 1200 parts of nitrobenzene. The suspension is heated to 140° and a solution of 39.2 parts of 2,4-dichloro-6-methylthio-s-triazine in 480 parts of distilled nitrobenzene is added dropwise to the reaction mixture at a temperature between 140° and 145° C. while introducing nitrogen. The mixture is then stirred for 4 hours at 140° C. to 145° C. Then 0.2 part of pyridine is added and stirring is continued for a further 5 hours. The reaction mixture is subsequently cooled to 80° C. and 90 parts of 4-chlorobenzoyl chloride and 0.4 part of pyridine are added. The reaction mixture is heated once more and stirred for 7 hours at 140° to 145° C., then cooled to 70°–80° C. and filtered. The residue is collected by suction and washed with ethanol until the washings no longer contain nitrobenzene. The filter cake is dried at 100° C. overnight in a vacuum drying cabinet.

Yield: 170 parts.
Shade: golden orange.

EXAMPLE 4

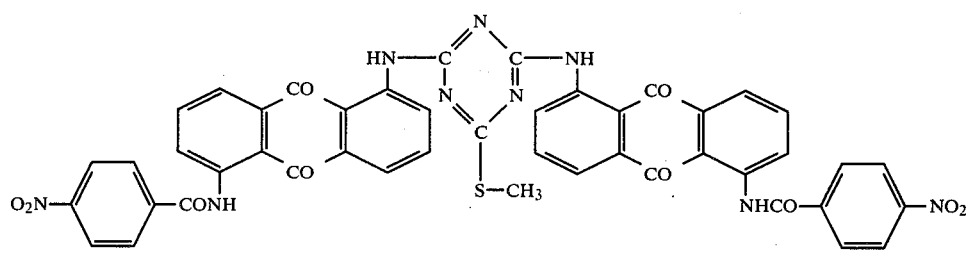

23.8 parts of 1,5-diaminoanthraquinone are suspended at room temperature in 300 parts of distilled nitrobenzene. The suspension is then heated to 140° C. and a solution of 9.8 parts of 2,4-dichloro-6-methylthio-s-triazine in 120 parts of distilled nitrobenzene are added dropwise to the reaction mixture at 140°–145° C. in the course of 4 hours while introducing nitrogen. The mixture is stirred for 4 hours at 140°–145° C. Then 0.7 part of pyridine is added and stirring is continued for a further 4 hours. The reaction mixture is cooled to 80° C. and then 20 parts of 4-nitrobenzoyl chloride and 0.1 part of pyridine are added. The mixture is heated to 140°–145° C. and stirred for 7 hours at this temperature, then cooled to 70°–80° C. and filtered. The residue is collected by suction and washed with ethanol until the washings no longer contain nitrobenzene. The filter cake is dried overnight at 100° C. in a vacuum drying cabinet.

Yield: 41 parts.
Shade: golden orange.

EXAMPLE 5

23.8 parts of 1,5-diaminoanthraquinone are suspended at room temperature in 300 parts of distilled nitrobenzene. The suspension is then heated to 140° C. and a solution of 9.8 parts of 2,4-dichloro-6-methylthio-s-triazine in 120 parts of distilled nitrobenzene are added dropwise to the reaction mixture at 140°–145° C. in the course of 4 hours while introducing nitrogen. The mixture is stirred for 4 hours at 140°–145° C. Then 0.1 part of pyridine is added and stirring is continued for a further 5 hours. The reaction mixture is cooled to 80° C. and then 20 parts of acetyl chloride and 0.1 part of pyridine are added. The mixture is heated to 80°–85° C. and stirred for 3 hours at this temperature, then cooled to 50° and filtered. The residue is collected by suction and washed with ethanol until the washings no longer contain nitrobenzene. The filter cake is dried overnight at 100° C. in a vacuum drying cabinet.

Yield: 33 parts.
Shade: golden orange.

EXAMPLE 6

The same dye is obtained by substituting acetyl bromide or acetic anhydride for acetyl chloride in Example 4.

EXAMPLE 7

(5)

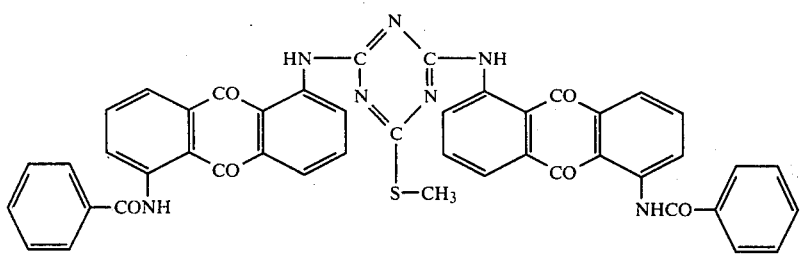

23.8 parts of 1,5-diaminoanthraquinone are suspended at room temperature in 300 parts of distilled o-dichlorobenzene. The suspension is then heated to 145°–150° C. and a solution of 9.8 parts of 2,4-dichloro-6-methylthio-s-triazine in 150 parts of distilled o-dichlorobenzene are added dropwise to the reaction mixture in the course of 4 hours while introducing nitrogen. The mixture is stirred for 4 hours at 140°–150° C. Then 0.1 part of pyridine is added and stirring is continued for a further 5 hours. The reaction mixture is cooled to 80° C. and then 20 parts of benzoyl chloride and 0.1 part of pyridine are added. The mixture is heated to 140°–145° C. and stirred for 7 hours at this temperature, then cooled to 70°–80° C. and filtered. The residue is collected by suction and washed with ethanol until the washings no longer contain o-dichlorobenzene. The filter cake is dried overnight at 100° C. in a vacuum drying cabinet.

Yield: 39 parts.

Shade: golden orange.

EXAMPLE 8

Analogous dyes having similar shades and fastness properties are obtained by substituting equivalent amounts of 2,4-dichloro-6-ethylthio-s-triazine, 2,4-dichloro-6-propylthio-s-triazine, 2,4-dichloro-6-isopropylthio-s-triazine or 2,4-dichloro-6-butylthio-s-triazine for the 2,4-dichloro-6-methylthio-s-triazine used in Examples 1 to 6.

EXAMPLE 9

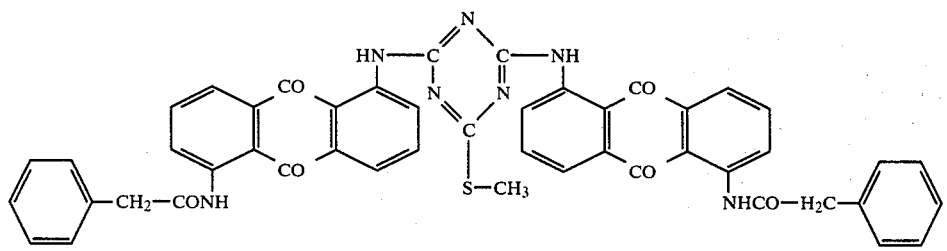

47.6 parts of 1,5-diaminoanthraquinone are suspended at room temperature in 600 parts of distilled nitrobenzene. The suspension is heated to 140° and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0.2 part of pyridine is added and stirring is continued for a further 5 hours. The reaction mixture is allowed to cool to 80° C. and 40 parts of phenylacetyl chloride and 0.2 part of pyridine are added. The reaction mixture is subsequently heated, stirred for 7 hours at 130° to 135° C., then cooled to room temperature and filtered. The residue is collected by suction and washed with ethanol until the washings no longer contain nitrobezene. The filter cake is dried at 100° C. overnight in a vacuum drying cabinet.

Yield: 73 parts.

Shade: reddish orange.

EXAMPLE 10

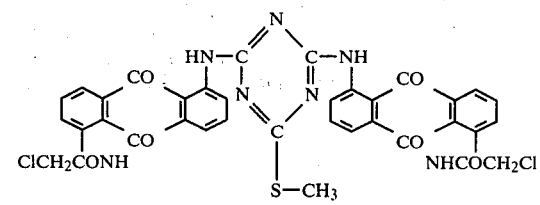

47.6 parts of 1,5-diaminoanthraquinone are suspended at room temperature in 600 parts of distilled nitrobenzene. The suspension is heated to 140° C. and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0.2 part of pyridine is added and stirring is continued for a further 5 hours. The reaction mixture is allowed to cool to 80° C. and 25 parts of chloroacetyl chloride are added. The reaction mixture is subsequently heated, stirred for 4 hours at 90° to 95° C., then cooled to room temperature and filtered. The residue is collected by suction and washed with ethanol until the washings no longer contain nitrobenzene. The filter cake is dried at 100° C. overnight in a vacuum drying cabinet.

Yield: 74 parts.

Shade: golden yellow.

The same product is obtained by substituting chloroacetic anhydride for chloroacetyl chloride.

EXAMPLE 11

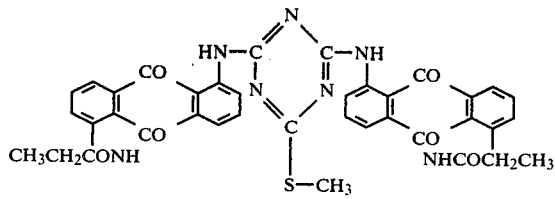

47.6 parts of 1,5-diaminoanthraquinone are suspended at room temperature in 600 parts of distilled nitrobenzene. The suspension is heated to 140° C. and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0.2 part of pyridine is added and stirring is continued for a further 5 hours. The reaction mixture is allowed to cool to 80° C. and 30 parts of propionyl chloride are added. The reaction mixture is subsequently heated, stirred for 5 hours at 90° to 95° C., then cooled to room temperature and filtered. The residue is collected by suction and washed with ethanol until the washings no longer contain nitrobenzene. The filter cake is dried at 100° C. overnight in a vacuum drying cabinet.

Yield: 68 parts.
Shade: yellow.

The same product is obtained by substituting propionic anhydride for propionyl chloride.

EXAMPLE 12

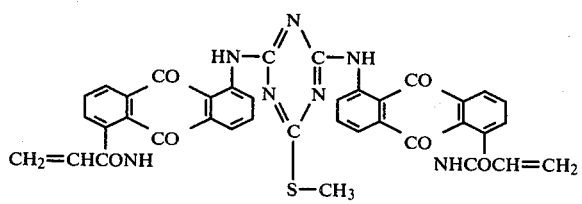

47.6 parts of 1,5-diaminoanthraquinone are suspended at room temperature in 600 parts of distilled nitrobenzene. The suspension is heated to 140° C. and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0.2 part of pyridine is added and stirring is continued for a further 5 hours. The reaction mixture is allowed to cool to 80° C. and 40 parts of acryloyl chloride are added. The reaction mixture is subsequently heated, stirred for 5 hours at 130° to 135° C., then cooled to room temperature and filtered. The residue is collected by suction and washed with ethanol until the washings no longer contain nitrobenzene. The filter cake is dried at 100° C. overnight in a vacuum drying cabinet.

Yield: 70 parts.
Shade: reddish orange.

The same product is obtained by substituting acrylic anhydride for acryloyl chloride.

EXAMPLE 13

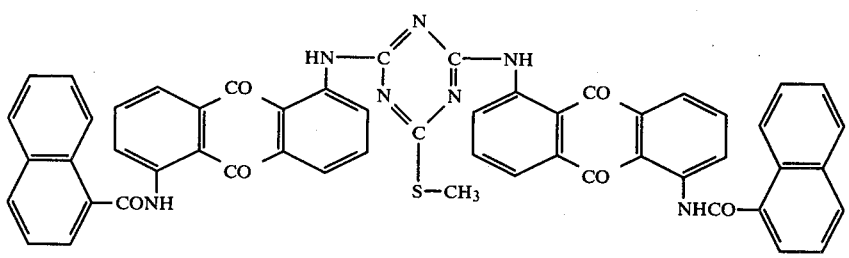

47.6 parts of 1,5-diaminoanthraquinone are suspended at room temperature in 600 parts of distilled nitrobenzene. The suspension is heated to 140° C. and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0.2 part of pyridine is added and stirring is continued for a further 5 hours. The reaction mixture is allowed to cooled to 80° C. and 40 parts of 1-naphthoyl chloride and 0.2 part of pyridine are added. The reaction mixture is subsequently heated, stirred for 4 hours at 140° to 145° C., then cooled to between 70° and 80° C. and filtered. The residue is collected by suction and washed with ethanol until the washings no longer contain nitrobenzene. The filter cake is dried at 100° C. overnight in a vacuum drying cabinet.

Yield: 85 parts.
Shade: yellowish brown.

The same product is obtained by substituting 1-naphthoic anhydride for 1-naphthoyl chloride.

EXAMPLE 14

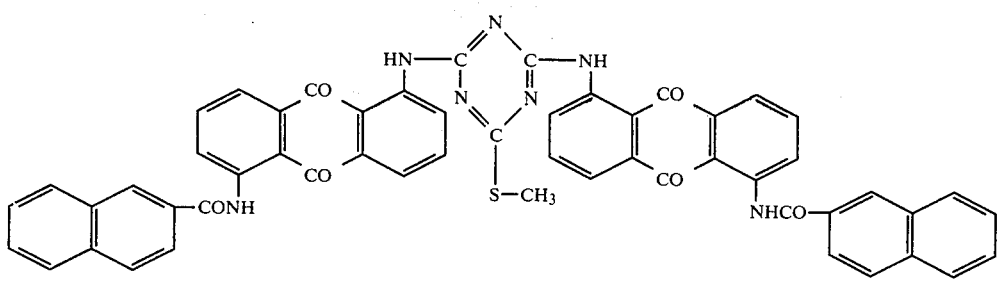

47.6 parts of 1,5-diaminoanrthaquinone are suspended at room temperature in 600 parts of distilled nitrobenzene. The suspension is heated to 140° C. and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0.2 part of pyridine is added and stirring is continued for a further 5 hours. The reaction mixture is allowed to cool to 80° C. and 40 parts of 2-naphthoyl chloride and 0.2 part of pyridine are added. The reaction mixture is subsequently heated, stirred for 4 hours at 140° to 145° C., then cooled to between 70° and 80° C. and filtered. The residue is collected by suction and washed with ethanol until the washings no longer contain nitrobenzene. The filter cake is dried at 100° C. overnight in a vacuum drying cabinet.

Yield: 89 parts.

Shade: yellowish brown.

The same product is obtained by substituting 2-naphthoic anhydride for 2-naphthoyl chloride.

EXAMPLE 15

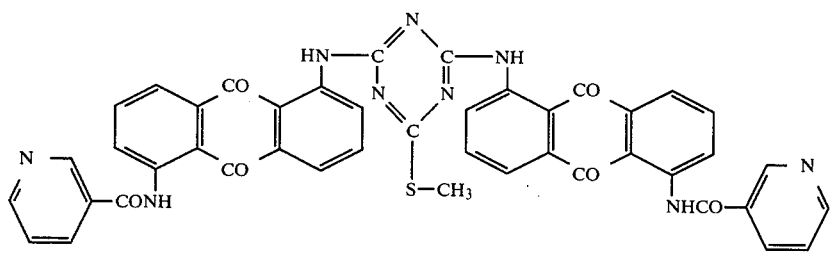

47.6 parts of 1,5-diaminoanthraquinone are suspended at room temperature in 600 parts of distilled nitrobenzene. The suspension is heated to 140° C. and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0,2 part of pyridine is added and stirring is continued for a further 5 hours. The reaction mixture is allowed to cool to 80° C. and 40 parts of nicotinoyl chloride and 0.2 part of pyridine are added. The reaction mixture is subsequently heated, stirred for 3 hours at 75° to 80° C., and for 2 hours at 130° to 135° C., then cooled to room temperature and filtered.

The residue is collected by suction and washed with ethanol until the washings no longer contain nitrobenzene. The filter cake is dried at 100° C. overnight in a vacuum drying cabinet.

Yield: 80 parts.

Shade: brillant orange.

EXAMPLE 16

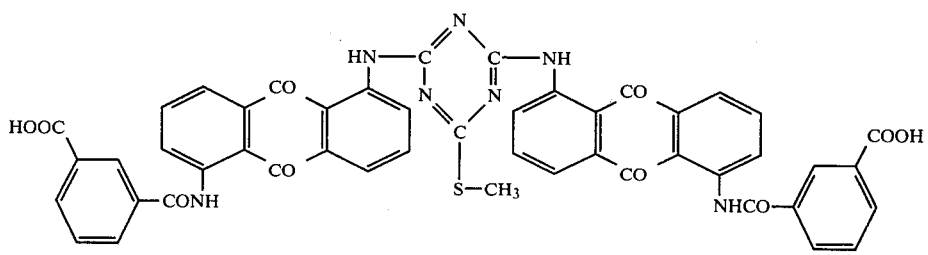

47.6 parts of 1,5-diaminoanthraquinone are suspended at room temperature in 600 parts of distilled nitrobenzene. The suspension is heated to 140° C. and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0.2 part of pyridine is added and stirring is continued for a further 5 hours. The reaction mixture is allowed to cool to 80° C. and 50 parts of isophthaloyl chloride are added. The reaction mixture is subsequently stirred for 4 hours at 80° to 85° C. and for 1 hour at 105° to 110° C., then cooled to between 70° and 80° C. and filtered. The residue is subjected to steam distillation until it no longer contains nitrobenzene. The filter cake is dried at 100° C. overnight in a vacuum drying cabinet.
Yield: 89 parts.
Shade: golden orange.

EXAMPLE 17

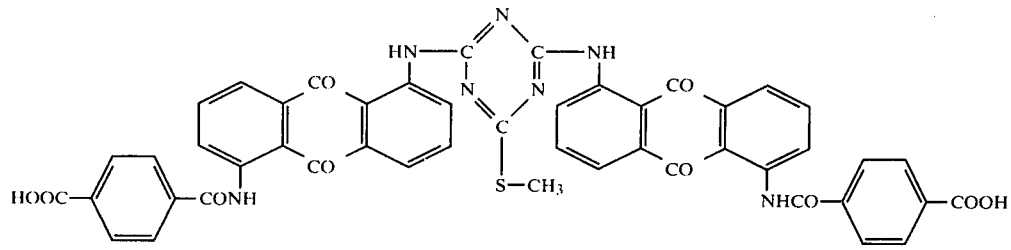

47.6 parts of 1,5-diaminoanthraquinone are suspended at room temperature in 600 parts of distilled nitrobenzene. The suspension is heated to 140° C. and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing nitrogen. The mixture is then stirred for a further 4 hours at 140° to 145° C. Then 0.2 part of pyridine is added and stirring is continued for a further 5 hours.

nitrogen. The mixture is stirred for a further 4 hours at 140° to 145° C. Then 0.2 part of pyridine is added and stirring is continued for a further 5 hours. The reaction mixture is allowed to cool to 80° C. and 57 parts of 1-aminoanthraquinone-2-carboxylic acid chloride and 0.2 part of pyridine are added. The reaction mixture is subsequently stirred for 2 hours at 80° to 85° C. and for 5 hours at 130° to 135° C., then cooled to room temperature and filtered. The residue is collected by suction and washed with ethanol until the washings no longer contain nitrobenzene. The filter cake is dried at 100° C. overnight in a vacuum drying cabinet.
Yield: 108 parts.
Shade: yellowish red.

EXAMPLE 19

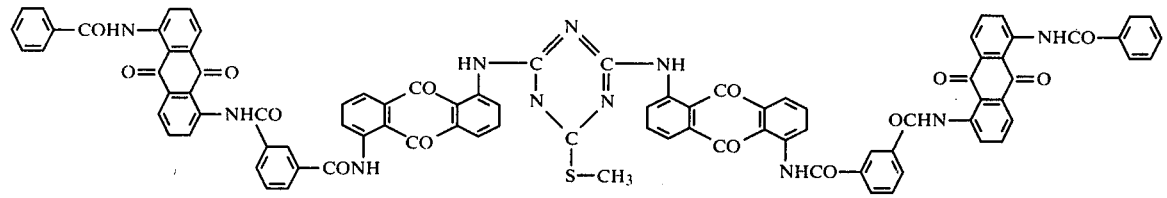

The reaction mixture is allowed to cool to 80° C. and 40 parts of terephthaloyl chloride are added. The reaction mixture is subsequently stirred for 4 hours at 80° to 85° C. and for 1 hour at 105° to 110° C., then cooled to between 70° and 80° C. and filtered. The residue is subjected to steam distillation until it no longer contains nitrobenzene. The filter cake is dried at 100° C. overnight in a vacuum drying cabinet.
Yield: 90 parts.
Shade: golden orange.

EXAMPLE 18

47.6 parts of 1,5-diaminoanthraquinone are suspended at room temperature in 600 parts of distilled nitrobenzene. The suspension is then heated to 140° C. and a solution of 19.6 parts of 2,4-dichloro-6-methylthio-s-triazine in 240 parts of distilled nitrobenzene are added dropwise to the reaction mixture at 140°–145° C. in the course of 4 hours while introducing nitrogen. The mixture is stirred for 4 hours at 140°–145° C. Then 0.2 part of pyridine is added and stirring is continued for a further 5 hours. The reaction mixture is allowed to cool to 80° C. and then 102 parts of 1,5-bis-benzoylaminoanthraquinone-3-carboxylic acid chloride, 500 parts of

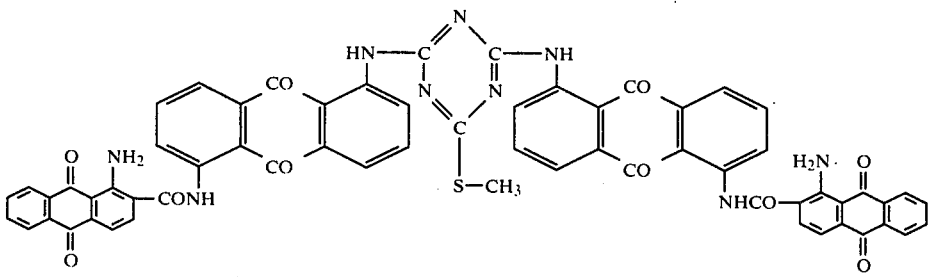

47.6 parts of 1,5-diaminoanthraquinone are suspended at room temperature in 600 parts of distilled nitrobenzene. The suspension is heated to 140° C. and a solution of 19.6 parts of 2,4-dichloro-6-methylthio-s-triazine in 240 parts of distilled nitrobenzene is added dropwise to the reaction mixture in the course of 4 hours at a temperature between 140° and 145° C. while introducing distilled nitrobenzene and 0.2 part of pyridine are added. The reaction mixture is then heated, stirred for 7 hours at 140°–145° C., cooled to 70°–80° C. and filtered. The residue is collected by suction and washed with ethanol until the washings no longer contain nitrobenzene. The filter cake is dried overnight at 100° C. in a vacuum drying cabinet.

Yield: 155 parts.
Shade: golden yellow.

EXAMPLE 20

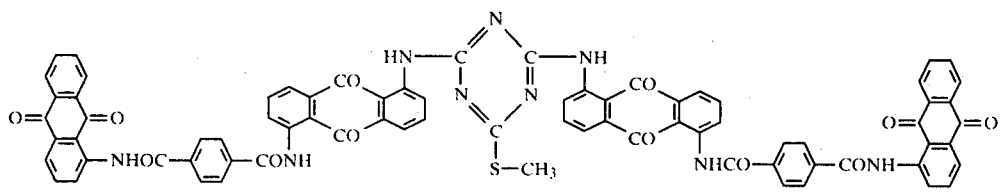

47.6 parts of 1,5-diaminoanthraquinone are suspended at room temperature in 600 parts of distilled nitrobenzene. The suspension is then heated to 140° C. and a solution of 19.6 parts of 2,4-dichloro-6-methylthio-s-triazine in 240 parts of distilled nitrobenzene are added dropwise to the reaction mixture at 140°–145° C. in the course of 4 hours while introducing nitrogen. The mixture is stirred for 4 hours at 140°–145° C. Then 0.2 part of pyridine is added and stirring is continued for a further 5 hours. The reaction mixture is allowed to cool to 80° C. and then 78 parts of 1-benzoylaminothraquinone-4-carboxylic acid chloride, 400 parts of distilled nitrobenzene and 0.2 part of pyridine are added. The reaction mixture is then heated, stirred for 7 hours at 140°–145° C., cooled to room temperature and filtered. The residue is collected by suction and washed with ethanol until the washings no longer contain nitrobenzene. The filter cake is dried overnight at 100° C. in a vacuum drying cabinet.

Yield: 127 parts.
Shade: golden yellow.

EXAMPLE 21

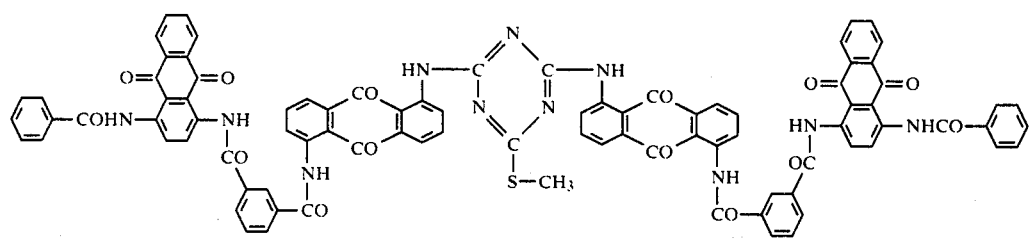

47.6 parts of 1,5-diaminoanthraquinone are suspended at room temperature in 600 parts of distilled nitrobenzene. The suspension is then heated to 140° C. and a solution of 19.6 parts of 2,4-dichloro-6-methylthio-s-triazine in 240 parts of distilled nitrobenzene are added dropwise to the reaction mixture at 140°–145° C. in the course of 4 hours while introducing nitrogen. The mixture is stirred for 4 hours at 140°–145° C. Then 0.2 parts of pyridine is added and stirring is continued for a further 5 hours. The reaction mixture is allowed to cool to 80° C. and then 102 parts of 1,4-bis-benzoylaminoanthraquinone-3-carboxylic acid chloride, 500 parts of distilled nitrobenzene and 0.2 part of pyridine are added. The reaction mixture is then heated, stirred for 7 hours at 140°–145° C., cooled to 70°–80° C. and filtered. The residue is collected by suction and washed with ethanol until the washings no longer contain nitrobenzene. The filter cake is dried overnight at 100° C. in a vacuum drying cabinet.

Yield: 140 parts.
Shade: orange.

EXAMPLE 22

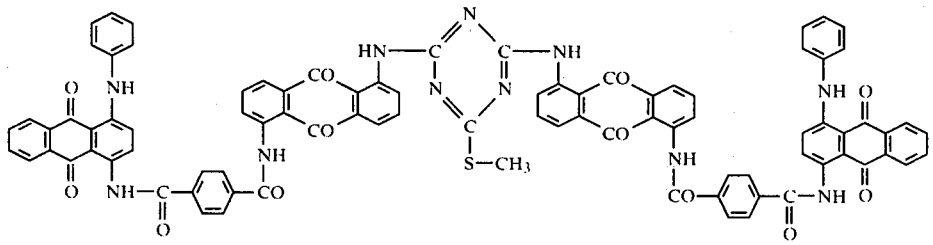

47.6 parts of 1,5-diaminoanthraquinone are suspended at room temperature in 600 parts of distilled nitrobenzene. The suspension is then heated to 140° C. and a solution of 19.6 parts of 2,4-dichloro-6-methylthio-s-triazine in 240 parts of distilled nitrobenzene are added dropwise to the reaction mixture at 140°–145° C. in the course of 4 hours while introducing nitrogen. The mixture is stirred for 4 hours at 140°–145° C. Then 0.2 parts of pyridine is added and stirring is continued for a further 5 hours. The reaction mixture is allowed to cool to 80° C. and then 96 parts of 1-anilido-4-benzoylaminoanthraquinone-4'-carboxylic acid chloride, 500 parts of distilled nitrobenzene and 0.2 part of pyridine are added. The reaction mixture is then heated, stirred for 7 hours at 140°–145° C., cooled to 70°–80° C. and filtered. The residue is collected by suction and washed with ethanol until the washings no longer contain nitrobenzene. The filter cake is dried overnight at 100° C. in a vacuum drying cabinet.

Yield: 148 parts.

Shade: olive brown.

EXAMPLE 23

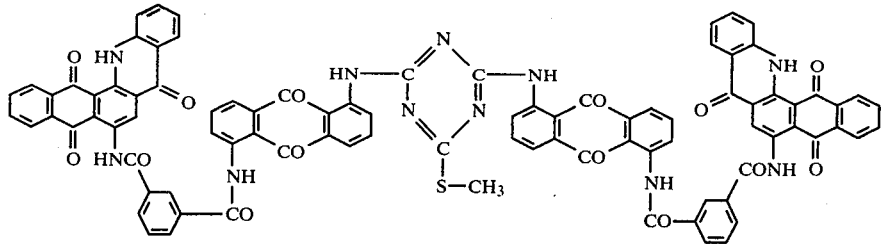

47.6 parts of 1,5-diaminoanthraquinone are suspended at room temperature in 600 parts of distilled nitrobenzene. The suspension is then heated to 140° C. and a solution of 19.6 parts of 2,4-dichloro-6-methylthio-s-triazine in 240 parts of distilled nitrobenzene are added dropwise to the reaction mixture at 140°–145° C. in the course of 4 hours at 140°–145° C. Then 0.2 parts of pyridine is added and stirring is continued for a further 5 hours. The reaction mixture is allowed to cool to 80° C. and then 101 parts of 2-(3'-chloroformyl-benzoylamino)-3,4-phthaloylacridone, 500 parts of distilled nitrobenzene and 0.2 parts of pyridine are added. The reaction mixture is then heated, stirred for 7 hours at 140°–145° C., cooled to 70°–80° C. and filtered. The residue is collected by suction and washed with ethanol until the washings no longer contain nitrobenzene. The filter cake is dried overnight at 100° C. in a vacuum drying cabinet.

Yield: 153 parts.
Shade: olive grey.

EXAMPLE 24

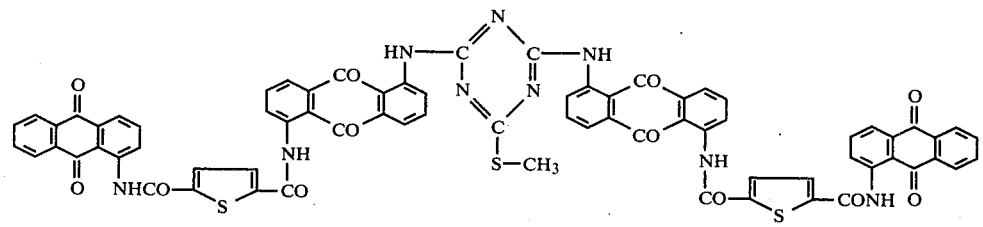

47.6 parts of 1,5-diaminoanthraquinone are suspended at room temperature in 600 parts of distilled nitrobenzene. The suspension is then heated to 140° C. and a solution of 19.6 parts of 2,4-dichloro-6-methylthio-s-triazine in 240 parts of distilled nitrobenzene are added dropwise to the reaction mixture at 140°–145° C. in the course of 4 hours while introducing nitrogen. The mixture is stirred for 4 hours at 140°–145° C. Then 0.2 part of pyridine is added and stirring is continued for a further 5 hours. The reaction mixture is allowed to cool to 80° C. and then 102 parts of the compound of the formula

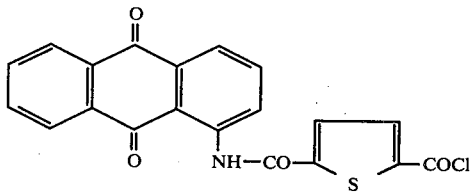

400 parts of distilled notrobenzene and 0.2 part of pyridine are added. The reaction mixture is then heated, stirred for 7 hours at 140°–145° C., cooled to 70°–80° C. and filtered. The residue is collected by suction and washed with ethanol until the washings no longer contain nitrobenzene. The filter cake is dried overnight at 100° C. in a vacuum drying cabinet.

Yield: 130 parts.
Shade: yellow.

EXAMPLE 25

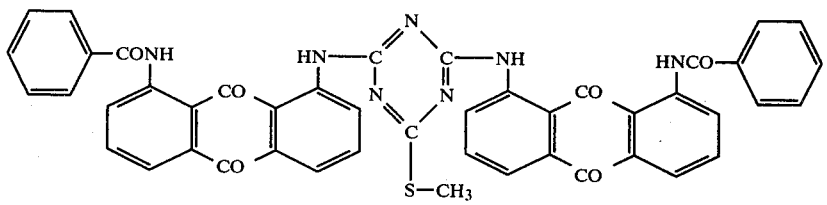

47.6 parts of 1,5-diaminoanthraquinone are suspended at room temperature in 600 parts of distilled nitrobenzene. The suspension is then heated to 140° C. and a solution of 19.6 parts of 2,4-dichloro-6-methylthio-s-triazine in 240 parts of distilled nitrobenzene are added dropwise to the reaction mixture at 140°–145° C. in the course of 4 hours while introducing nitrogen. The mixture is stirred for 4 hours at 140°–145° C. Then 0.2 part of pyriding is added and stirring is continued for a further 5 hours. The reaction mixture is allowed to cool to 80° C. and then 40 parts of benzoyl chloride and 0.2 part of pyridine are added. The reaction mixture is then heated, stirred for 5 hours at 140°–145° C., cooled to 70°–80° C. and filtered. The residue is collected by suction and washed with ethanol until the washings no longer contain nitrobenzene. The filter cake is dried overnight at 100° C. in a vacuum cabinet.
Yield: 74 parts.
Shade: orange.

EXAMPLE 26

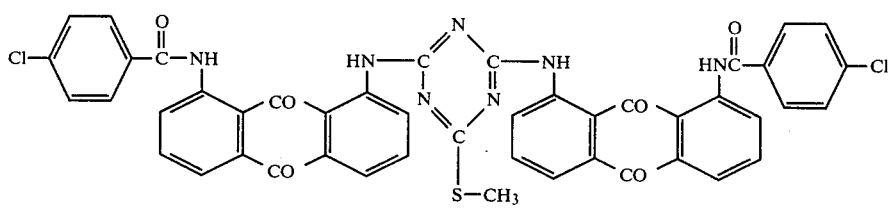

95.2 parts of 1,8-diaminoanthraquinone are suspended at room temperature in 1200 parts of distilled nitrobenzene. The suspension is then heated to 140° C. and a solution of 39.2 parts of 2,4-dichloro-6-methylthio-s-triazine in 480 parts of distilled nitrobenzene are added dropwise to the reaction mixture at 140°–145° C. in the course of 4 hours while introducing nitrogen. The mixture is stirred for 4 hours at 140°–145° C. Then 0.4 part of pyridine is added and stirring is continued for a further 5 hours. The reaction mixture is allowed to cool to 80° C. and then 90 parts of 4-chlorobenzoyl chloride and 0.4 part of pyridine are added. The reaction mixture is then heated, stirred for 7 hours at 140°–145° C., cooled to 70°–80° C. and filtered. The residue is collected by suction and washed with ethanol until the washings no longer contain nitrobenzene. The filter cake is dried overnight at 100° C. in a vacuum drying cabinet.
Yield: 158 parts.
Shade: orange.

EXAMPLE 27

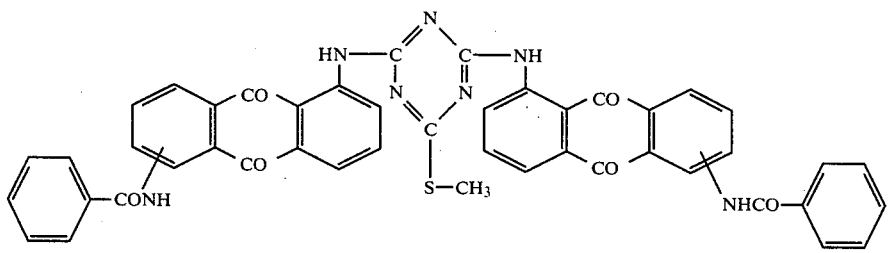

47.6 parts of a mixture of 31.2 parts of 1,8-diaminoanthraquinone, 7.1 parts of 1,5-diaminoanthraquinone, 7 parts of 1,7-diaminoanthraquinone, 1.64 parts of 1,6-diaminoanthraquinone, 0.38 part of β-isomers and 0.28 part of 1-aminoanthraquinone are suspended at room temperature in 600 parts of distilled nitrobenzene. The suspension is then heated to 140° C. and a solution of 19.6 parts of 2,4-dichloro-6-methylthio-s-triazine in 240 parts of distilled nitrobenzene are added dropwise to the reaction mixture at 140°–145° C. in the course of 4 hours while introducing nitrogen. The mixture is stirred for 4 hours at 140°–145° C. Then 0.2 part of pyridine is added and stirring is continued for a further 5 hours. The reaction mixture is allowed to cool to 80° C. and then 40 parts of benzoyl chloride and 0.2 part of pyridine are added. The reaction mixture is then heated, stirred for 6 hours at 140°–145° C., cooled to 70°–80° C. and filtered. The residue is collected by suction and washed with ethanol until the washings no longer contain nitrobenzene. The filter cake is dried overnight at 100° C. in a vacuum drying cabinet.
Yield: 75 parts.
Shade: yellowish orange.

EXAMPLE 28

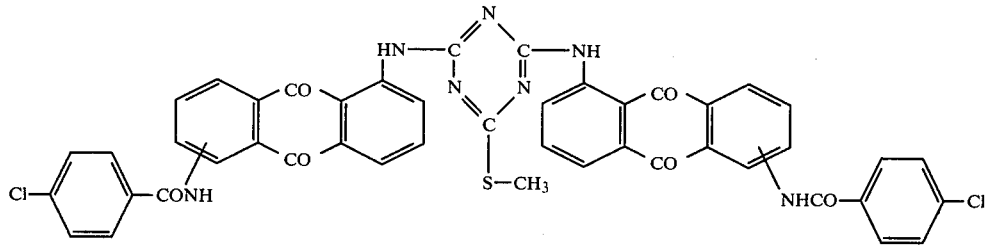

95.2 parts of a mixture of 62 parts of 1,8-diaminoanthraquinone, 1.42 parts of 1,5-diaminoanthraquinone, 14 parts of 1,7-diaminoanthraquinone, 3.28 parts of 1,6-diaminoanthraquinone, 0.76 part of β-isomers and 0.65 part of 1-aminoanthraquinone are suspended at room temperature in 1200 parts of distilled nitrobenzene. The suspension is then heated to 140° C. and a solution of 39.2 parts of 2,4-dichloro-6-methylthio-s-triazine in 480 parts of distilled nitrobenzene are added dropwise to the reaction mixture at 140°–145° C. in the course of 4 hours while introducing nitrogen. The mixture is stirred for 4 hours at 140°–145° C. Then 0.4 part of pyridine is added and stirring is continued for a further 5 hours. The reaction mixture is cooled to 80° C. and then 90 parts of 4-chlorobenzoyl chloride and 0.4 part of pyridine are added. The mixture is heated to 140°–145° C. and stirred for 7 hours at this temperature, then cooled to 70°–80° C. and filtered. The residue is collected by suction and washed with ethanol until the washings no longer contain nitrobenzene. The filter cake is dried overnight at 100° C. in a vacuum cabinet.

Yield: 160 parts.
Shade: yellowish orange.

EXAMPLE 29

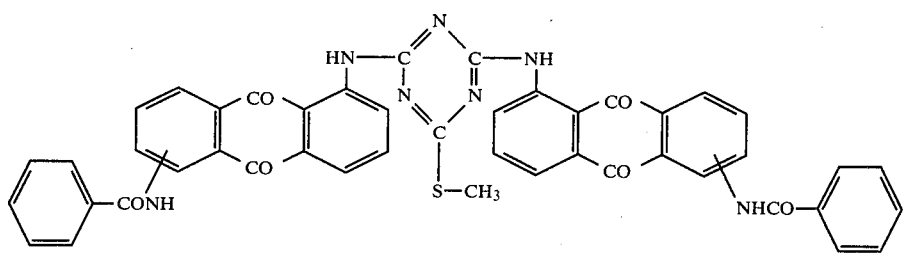

47.6 parts of a mixture of 18.5 parts of 1,6-diaminoanthraquinone, 11.5 parts of 1,8-diaminoanthraquinone, 8.3 parts of 1,7-diaminoanthraquinone, 3.2 parts of 1,5-diaminoanthraquinone, 1.2 parts of 2,6-diaminoanthraquinone, 1.3 parts of 2,7-diaminoanthraquinone, 0.7 part of 1-aminoanthraquinone, 0.3 part of 2-aminoanthraquinone and 2.6 parts of aminohydroxyanthraquinone are suspended at room temperature in 600 parts of distilled nitrobenzene. The suspension is then heated to 140° C. and a solution of 19.6 parts of 2,4-dichloro-6-methylthio-s-triazine in 240 parts of distilled nitrobenzene are added dropwise to the reaction mixture at 140°–145° C. in the course of 4 hours while introducing nitrogen. The mixture is stirred for 4 hours at 140°–145° C. Then 0.2 part of pyridine is added and stirring is continued for a further 5 hours. The reaction mixture is cooled to 80° C. and then 40 parts of benzoyl chloride and 0.2 part of pyridine are added. The reaction mixture is heated and stirred for 7 hours at 140°–145° C., then cooled to 70°–80° C. and filtered. The residue is collected by suction and washed with ethanol until the washings no longer contain nitrobenzene. The filter cake is dried overnight at 100° C. in a vacuum drying cabinet.

Yield: 70 parts.
Shade: yellowish brown.

EXAMPLE 30

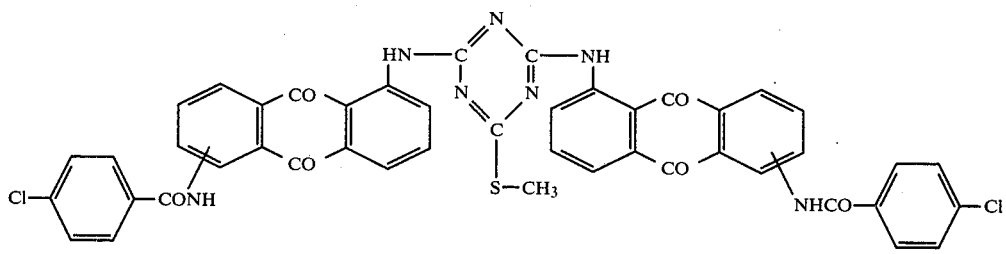

95.2 parts of a mixture consisting of 37 parts of 1,6-diaminoanthraquinone, 23 parts of 1,8-diaminoanthraquinone, 16.6 parts of 1,7-diaminoanthraquinone, 6.4 parts of 1,5-diaminoanthraquinone, 2.4 parts of 2,6-diaminoanthraquinone, 2.6 parts of 2,7-diaminoanthraquinone, 1.4 parts of 1-aminoanthraquinone, 0.6 part of 2-aminoanthraquinone and 5.2 parts of aminohydroxyanthraquinone are suspended at room temperature in 1200 parts of distilled nitrobenzene. The suspension is then heated to 140° C. and a solution of 39.2 parts of 2,4-dichloro-6-methylthio-s-triazine in 120 parts of distilled nitrobenzene are added dropwise to the reaction mixture at 140°–145° C. in the course of 4 hours while introducing nitrogen. The mixture is stirred for 4 hours at 140°–145° C. Then 0.4 part of pyridine is added and stirring is continued for a further 5 hours. The reaction mixture is cooled to 80° C. and then 90 parts of 4chlorobenzoyl chloride and 0.4 part of pyridine are added. The mixture is heated once more and stirred for 7 hours at 140°–145° C., then cooled to 70°–80° C. and filtered. The residue is collected by suction and washed with ethanol until the washings no longer contain nitrobenzene. The filter cake is dried overnight at 100° C. in a vacuum drying cabinet.

Yield: 150 parts.
Shade: yellowish brown.

DYEING PROCEDURE I 1 part of the dye of Example 1 is vatted at 50°–70° C. with 10 parts by volume of sodium hydroxide having a specific gravity of 36° Be and 5 parts of sodium hydrosulfite in 200 parts of water. The above stock vat is added to a dyebath which contains in 2000 parts of water 5 parts by volume of sodium hydroxide solution with a specific gravity of 36° Be and 3.7 parts of sodium hydrosulfite. 100 parts of cotton are put into this bath at 40° C. After 10 minutes, 15 parts of sodium chloride are added and after 20 minutes a further 15 parts are added and dyeing is performed for 45 minutes at 40° C. The cotton is squeezed out, oxidised, and finished in the usual manner.

DYEING PROCEDURE II 1 part of the dye obtained according to Example 1 and 0.5 part of CI Disperse Yellow 84 are ground wet with 2.5 parts of a 50% aqueous solution of the sodium salt of dinaphthylmethanedisulfonic acid. A dyebath is prepared with this dyestuff preparation, 2 parts of ammonium sulfate and 1000 parts of water and its pH is brought to 6.0 to 6.9 with monosodium phosphate. 100 parts of a cotton/polyester blend (67%PE) is put into this bath and the temperature is raised over the course of 45 minutes to 120°–125° C. Dyeing is performed for 60 minutes at this temperature in a closed vessel. The bath is allowed to cool to 60°–70° C. and 20 parts by volume of sodium hydroxide having a specific gravity of 36° Be and 5 parts of sodium hydrosulfite are added. After 45 minutes the fabric is squeezed, oxidised and finished in the usual manner. A yellow blend is obtained.

PIGMENT COLOURATION 5 parts of the dye obtained in Example 1 are mixed with 95 parts of dioctyl phthalate and ground in a ball mill until the particles are smaller than 3μ. 0.8 part of this dioctyl phthalate paste is mixed with 13 parts of polyvinyl chloride, 7 parts of dioctyl phthalate and 0.1 cadmium stearate and this mixture is then rolled for 5 minutes in a two-roll mill at 140° C.

A material having a yellow colouration with good migration properties and good fastness to light is obtained.

COLOURATION OF LACQUERS 10 g of titanium dioxide and 2 g of the dye obtained in Example 1 are ground in a ball mill for 48 hours together with a mixture of 26.4 g of coconut alkyl resin, 24.0 g of melamine-formaldehyde resin (50% solids content), 8.8 g of ethylene glycol monomethyl ether and 28.8 g of xylene.

By spraying this lacquer on an aluminium sheet, predrying it for 30 minutes at room temperature and then stoving it for 30 minutes at 120° C., there is obtained a clear, deep red coating which is distinguished by good fastness to atmospheric influences while having good colour strength.

What is claimed is:

1. A process for the manufacture of vat dyes of the formula

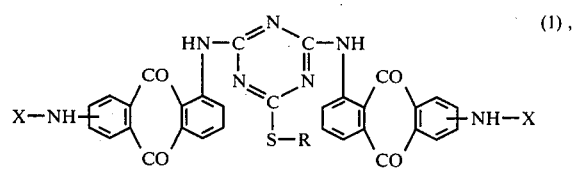

wherein R is alkyl of 1 to 4 carbon atoms and X is an acyl radical, which comprises condensing a diaminoanthraquinone of the formula

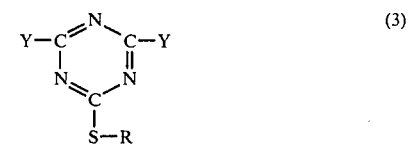

or mixtures of diaminoanthraquinones of the formula (2), with a 2,4-dihalogeno-6-alkylthio-s-triazine of the formula

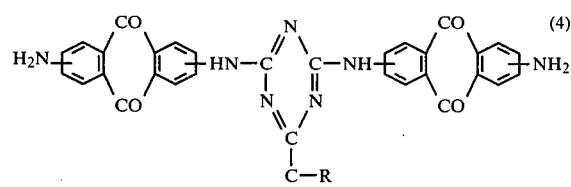

wherein Y is halogen and R is as defined for formula (1), in the molar ratio 2:1, and condensing the resulting intermediate of the formula

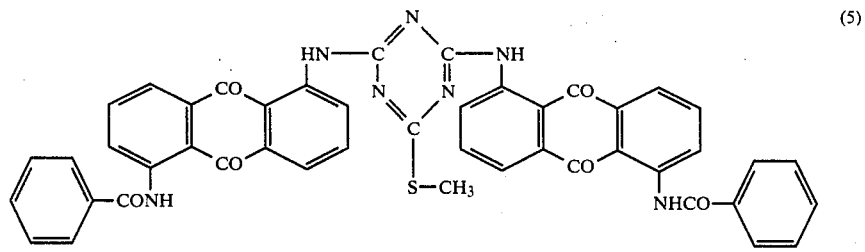

with an acylating agent containing the acyl radical X which is as defined for formula (1), in the molar ratio 1:2.

2. A process according to claim 1 which comprises dissolving the 2,4-dihalogeno-6-alkylthio-s-triazine in an organic solvent at elevated temperature, adding the resulting solution slowly to the solution or suspension of the diaminoanthraquinone in an inert organic solvent, and then, when the addition of the 2,4-dihalogeno-6-alkylthio-s-triazine is complete, adding a condensation catalyst and bringing the condensation to completion, and, finally, adding the acylating agent to the reaction mixture, if desired together with a condensation catalyst, and bringing the condensation reaction to completion.

3. A process according to claim 2, wherein nitrobenzene or o-dichlorobenzene is used as inert organic solvent.

4. A process according to claim 3, wherein 1,5-diaminoanthraquinone, 2,4-dichloro-6-methylthio-s-triazine and benzoyl chloride are condensed in nitrobenzene to produce the vat dye of the formula

* * * * *

UNITED STATES PATENT AND TRADEMARK OFFICE
CERTIFICATE OF CORRECTION

PATENT NO. : 4,265,633 -  
DATED : MAY 5, 1981  
INVENTOR(S) : ATHANASSIOS TZIKAS

Page 1 of 2

It is certified that error appears in the above—identified patent and that said Letters Patent is hereby corrected as shown below:

Claim 1, Column 25, Line 38:

"formula" should read:

--formula

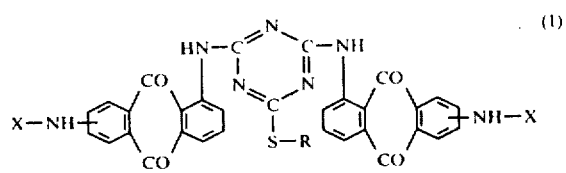

--.

UNITED STATES PATENT AND TRADEMARK OFFICE
CERTIFICATE OF CORRECTION

PATENT NO. : 4,265,633

DATED : MAY 5, 1981

INVENTOR(S) : ATHANASSIOS TZIKAS

It is certified that error appears in the above—identified patent and that said Letters Patent is hereby corrected as shown below:

Column 26, Line 5:

"
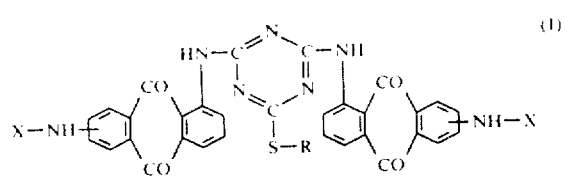
(1)
"

Should read:

-- 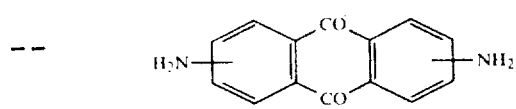 (2) --.

Signed and Sealed this

Thirteenth Day of October 1981

[SEAL]

Attest:

Attesting Officer

GERALD J. MOSSINGHOFF

Commissioner of Patents and Trademarks